United States Patent
Inoue et al.

(10) Patent No.: US 6,912,849 B2
(45) Date of Patent: Jul. 5, 2005

(54) CYLINDER DRIVING SYSTEM AND ENERGY REGENERATING METHOD THEREOF

(75) Inventors: Hiroaki Inoue, Hiratsuka (JP); Noboru Kanayama, Ninomiya-machi (JP); Koichiro Itow, Tokyo (JP); Hikosaburo Hiraki, Oyama (JP); Hideaki Saito, Oyama (JP)

(73) Assignee: Komatsu Ltd., Tokyo (JP)

( * ) Notice: Subject to any disclaimer, the term of this patent is extended or adjusted under 35 U.S.C. 154(b) by 57 days.

(21) Appl. No.: 10/404,519

(22) Filed: Apr. 1, 2003

(65) Prior Publication Data

US 2003/0188530 A1 Oct. 9, 2003

(30) Foreign Application Priority Data

Apr. 9, 2002 (JP) .................................. 2002-106453

(51) Int. Cl.[7] .............................................. F04B 17/00
(52) U.S. Cl. ............................ 60/475; 60/476; 417/225
(58) Field of Search ............................ 60/475, 476, 419; 417/225

(56) References Cited

U.S. PATENT DOCUMENTS

| | | | | |
|---|---|---|---|---|
| 2,210,144 A | * | 8/1940 | Day ............................ | 60/475 |
| 2,543,989 A | * | 3/1951 | Rockwell ..................... | 60/475 |
| 2,927,429 A | * | 3/1960 | Carlson ........................ | 60/475 |
| 4,077,746 A | * | 3/1978 | Reynolds ..................... | 417/225 |
| 4,961,316 A | * | 10/1990 | Corke et al. .................. | 60/476 |
| 6,055,809 A | * | 5/2000 | Kishi et al. ................... | 60/475 |
| 6,116,138 A | * | 9/2000 | Achten ........................ | 417/225 |
| 6,223,529 B1 | * | 5/2001 | Achten ........................ | 60/419 |
| 6,575,076 B1 | * | 6/2003 | Achten ........................ | 60/419 |

FOREIGN PATENT DOCUMENTS

| | | |
|---|---|---|
| JP | 60-122579 U | 8/1985 |
| WO | WO 01/88381 A1 | 11/2001 |

* cited by examiner

Primary Examiner—Edward K. Look
Assistant Examiner—Michael Leslie
(74) Attorney, Agent, or Firm—Frishauf, Holtz, Goodman & Chick, P.C.

(57) ABSTRACT

A cylinder driving system capable of reducing the number of hydraulic devices and the amount of energy loss and an energy regenerating method thereof are provided. To this end, the system includes i) a hydraulic cylinder, ii) a hydraulic pump having three suction/discharge ports of a first port for supplying oil to a bottom chamber of the hydraulic cylinder or draining oil from the bottom chamber, a second port for draining oil from a head chamber of the hydraulic cylinder or supplying oil to the head chamber, and a third port for draining oil from a tank or supplying oil to the tank, the suction rate or the discharge rate in the first port being the sum of the respective discharge rates or suction rates in the second port and the third port, and iii) a driving source for driving the hydraulic pump.

9 Claims, 11 Drawing Sheets

F I G. 1 2
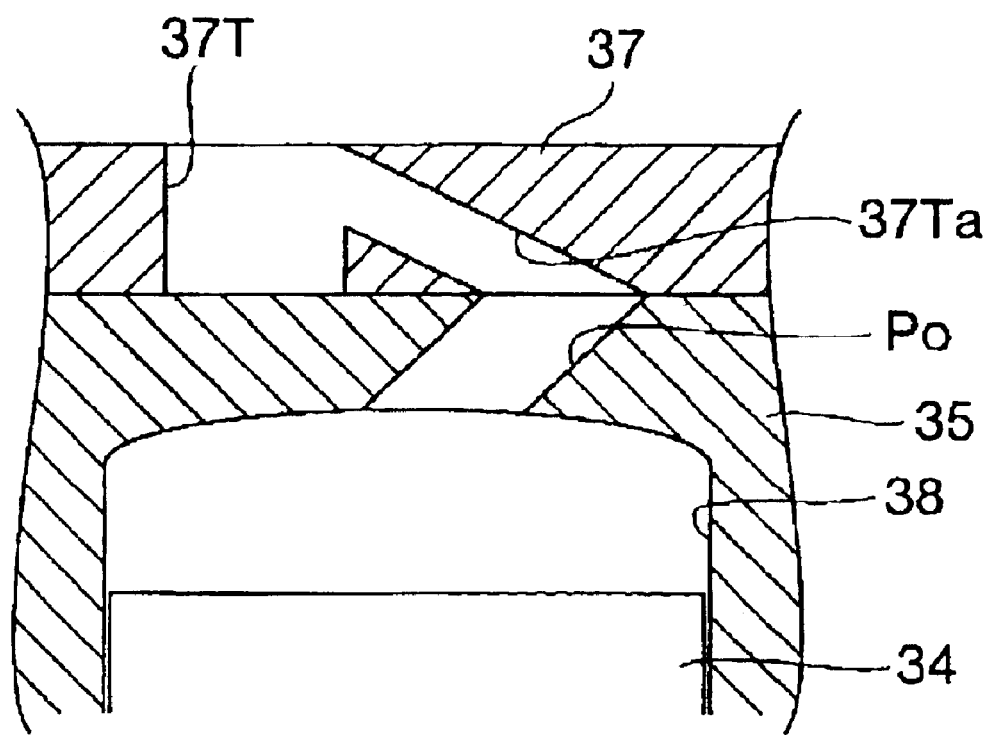

US 6,912,849 B2

CYLINDER DRIVING SYSTEM AND ENERGY REGENERATING METHOD THEREOF

TECHNICAL FIELD

The present invention relates to a cylinder driving system and an energy regenerating method thereof.

BACKGROUND ART

Hitherto, as methods of controlling the flow rate of a hydraulic cylinder which is frequently used in construction equipment, a working vehicle, industrial machinery, or the like, a method of controlling the rotation speed and rotation direction of a hydraulic pump and a method of controlling the displacement of a bi-directional dischargeable type (bent axis type, swash plate type, or the like) hydraulic pump are known.

An example of prior arts of the aforementioned method of controlling the rotation speed and rotation direction of the hydraulic pump is disclosed in International Publication WO 01/88381, and FIG. 13 shows a principal portion of a driving circuit diagram disclosed in said Bulletin. In FIG. 13, two hydraulic pumps 41 and 42 are driven by an electric motor 2. One output port of the first hydraulic pump 41 is connected to a head chamber of a hydraulic cylinder 3 via a pipe line 50, and the other output port is connected to a bottom chamber of the hydraulic cylinder 3 via a pipe line 51. One output port of the second hydraulic pump 42 is connected to the pipe line 51, and the other output port is connected to an accumulator 43 via an on-off valve 44 and a pipe line 53. The pipe line 50 is connected to the accumulator 43 via a first safety valve 45a and a first check valve 46a and through a pipe line 52. Similarly, the pipe line 51 is connected to the accumulator 43 via a second safety valve 45b and a second check valve 46b and through the pipe line 52.

According to the aforementioned constitution, when the hydraulic cylinder 3 is contracted, by rotating the hydraulic pumps 41 and 42 in a contracting direction by the electric motor 2, part of pressure oil in the bottom chamber is sucked into the first hydraulic pump 41 via the pipe line 51 and discharged from the hydraulic pump 41, and flows into the head chamber via the pipe line 50. The other excess pressure oil is sucked into the second hydraulic pump 42, discharged from the hydraulic pump 42, and accumulated in the accumulator 43 via the on-off valve 44 and the pipe line 53. On the other hand, when the hydraulic cylinder 3 is extended, by rotating the hydraulic pumps 41 and 42 in an extending direction by the electric motor 2, the first hydraulic pump 41 sucks in pressure oil in the head chamber via the pipe line 50 and discharges it to the bottom chamber via the pipe line 51. On this occasion, an equal quantity of pressure oil to compensate a deficiency in the bottom chamber is sucked from the accumulator 43 via the pipe line 53 and the on-off valve 44 and discharged by the second hydraulic pump 42, and flows into the bottom chamber via the pipe line 51. It is necessary to absorb a difference between the inflow rate and the outflow rate of pressure oil in the respective chambers which is caused by the difference in pressure receiving area between the bottom chamber and the head chamber of the hydraulic cylinder 3. Thanks to such a constitution, the difference in flow rate between the bottom chamber and the head chamber can be absorbed by two hydraulic pumps 41 and 42 and the accumulator 43.

Moreover, an example of prior arts of the method of controlling the displacement of the bidirectional dischargeable type hydraulic pump is a cylinder driving circuit shown in FIG. 14 which is disclosed in Japanese Utility Model No. 60-122579. In FIG. 14, two ports of a bidirectional dischargeable type hydraulic pump 64 are connected to a bottom chamber and a head chamber of a hydraulic cylinder 61. via a control valve 71, respectively. A rod of the hydraulic cylinder 61 is coupled to a slide of a press 62. The switching of the discharge direction of the hydraulic pump 64 is controlled by a regulator 66 to which pilot oil is supplied from a pilot pump 65. A tank 73 is coupled to the control valve 71 via a pipe line. A prefill valve 72 is provided between the bottom chamber (the slide descending side) of the hydraulic cylinder 61 and the tank 73, and when the oil feed amount from the hydraulic pump 64 is not sufficient when the press 62 is in operation, oil is supplied from the tank 73 via the prefill valve 72.

The aforementioned prior arts, however, have the following disadvantages. In a cylinder driving system disclosed in International Publication WO 01/88381, the two hydraulic pumps 41 and 42 and the accumulator 43 need to be provided in order to absorb the difference in flow rate between the head chamber and the bottom chamber of the hydraulic cylinder 3. Accordingly, the time required for piping work is greater, and moreover manufacturing costs increase. In the cylinder driving circuit disclosed in Japanese Utility Model No. 60-122579, part of oil discharged from the bottom chamber of the hydraulic cylinder 61 when the slide ascends (excess oil over the head chamber side capacity) is returned from the control valve 71 to the tank 73. Hence, there is a disadvantage that energy loss of the pressure oil in the control valve 71 is large, whereby efficient work by the hydraulic cylinder becomes impossible.

SUMMARY OF THE INVENTION

The present invention is made in view of the aforementioned disadvantages, and its object is to provide a cylinder driving system capable of reducing the number of hydraulic devices for absorbing the difference in flow rate between a head chamber and a bottom chamber of a hydraulic cylinder and besides capable of reducing energy loss, and an energy regenerating method thereof.

In order to attain the aforementioned object, a cylinder driving system according to the present invention includes: a hydraulic cylinder; a hydraulic pump which includes three suction/discharge ports of a first port for supplying oil to a bottom chamber of the hydraulic cylinder or draining oil from the bottom chamber, a second port for draining oil from a head chamber of the hydraulic cylinder or supplying oil to the head chamber, and a third port for draining oil from a tank or supplying oil to the tank, a suction rate in the first port being a sum of respective discharge rates in the second port and the third port or a discharge rate in the first port being a sum of respective suction rates in the second port and the third port; and a driving source for driving the hydraulic pump.

According to this constitution, when the hydraulic cylinder is extended, oil in the head chamber is sucked from the second port and discharged to the bottom chamber from the first port, and a difference in flow rate between the bottom chamber and the head chamber is sucked from the tank via the third port. When the hydraulic cylinder is contracted, oil in the bottom chamber is sucked from the first port and discharged to the head chamber from the second port, and excess oil is returned to the tank from the third port. Hence, the difference in flow rate between the bottom chamber and the head chamber can be absorbed by one hydraulic pump, and the hydraulic cylinder can be driven in a closed circuit. As a result, although two hydraulic pumps and an accumulator are used in a prior art disclosed in International Publication WO 01/88381, in the present invention, one hydraulic pump can replace them, whereby the circuit configuration can be simplified. Moreover, although energy loss in a control valve (switching valve) is large in a prior art disclosed in Japanese Utility Model No. 60-122579, in the present invention, the energy loss in the switching valve can be eliminated since the switching valve is unnecessary, and moreover energy loss in the hydraulic pump can be reduced since the electric motor is rotated by pressure oil in either one of the first port or the second port.

In the cylinder driving system, the control of a discharge rate, a suction rate, and a discharge direction of the hydraulic pump may be performed by controlling a rotation speed and a rotation direction of the driving source or by controlling displacement with the hydraulic pump being a bidirectional dischargeable type. According to this constitution, the discharge rate, suction rate, and discharge direction of the hydraulic pump are controlled by controlling the rotation speed and direction of the driving source, and hence the circuit configuration is simplified more compared with a displacement control type such as a swash plate or a bent axis type. Moreover, when the control is performed by controlling displacement with the hydraulic pump being a bidirectional dischargeable type, the responsibility of control of switching the discharge direction is good, whereby it is effective when direction switching is frequently performed, and in addition, the driving source can be run to rotate in a fixed direction.

An energy regenerating method of a cylinder driving system according to the present invention comprises the steps of: controlling a rotation speed and a rotation direction of a hydraulic pump, which includes three suction/discharge ports of a first port for supplying oil to a bottom chamber of a hydraulic cylinder or draining oil from the bottom chamber, a second port for draining oil from a head chamber of the hydraulic cylinder or supplying oil to the head chamber, and a third port for draining oil from a tank or supplying oil to the tank, a suction rate in the first port being a sum of respective discharge rates in the second port and the third port or a discharge rate in the first port being a sum of respective suction rates in the second port and the third port, by an electric motor; and recovering regenerated energy during regenerative braking of the hydraulic pump via the electric motor.

According to this method, a closed circuit of a hydraulic cylinder driving system can be configured by one hydraulic pump, and the regenerated energy during the regenerative braking of the hydraulic pump can be recovered by the electric motor, whereby energy efficiency can be increased.

BRIEF DESCRIPTION OF THE DRAWINGS

FIG. 12 is a sectional view taken along the line 12—12 in FIG. 11;

BEST MODE FOR CARRYING OUT THE INVENTION

Embodiments of the present invention will be described below with reference to the drawings.

Figure 1:
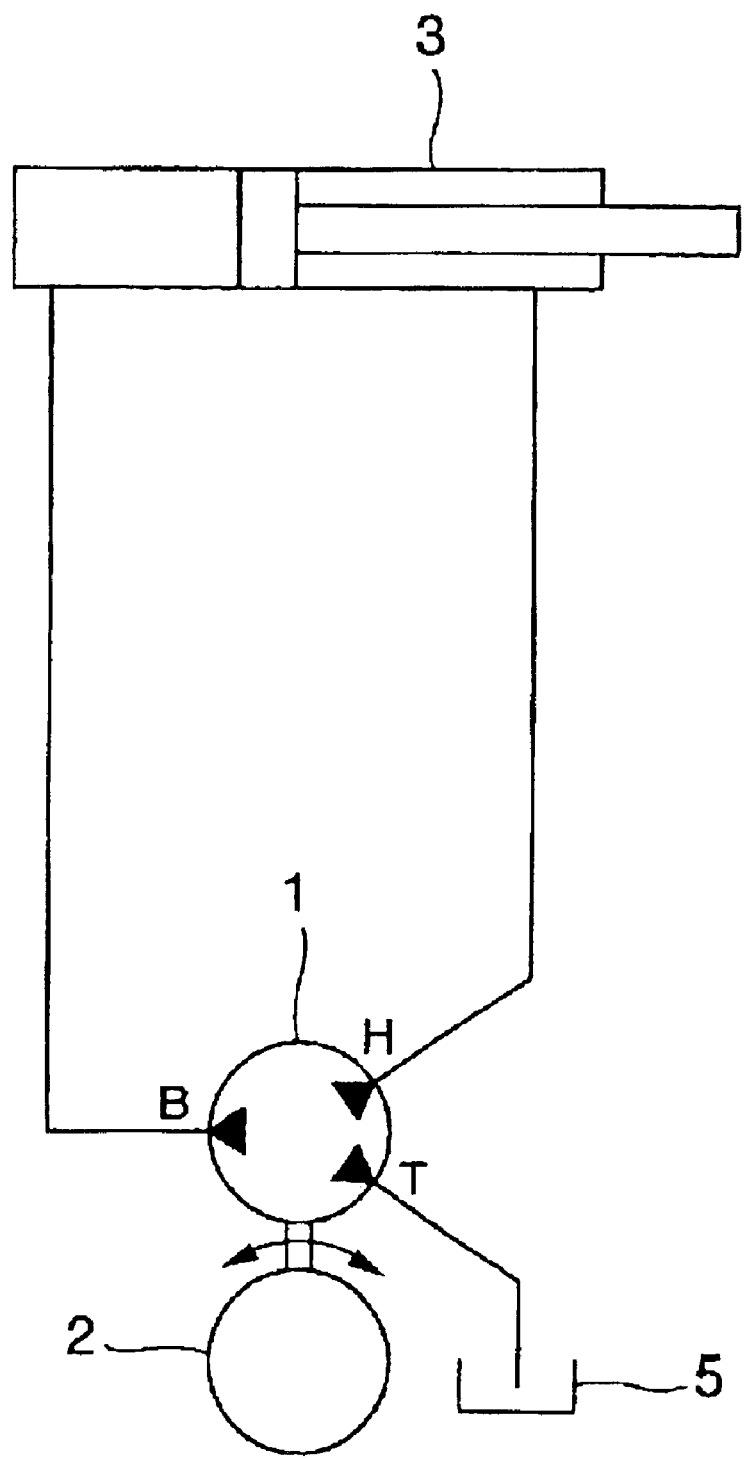
FIG. 1 shows a basic circuit of a cylinder driving system according to the present invention.

First, a basic circuit of a cylinder driving system according to the present invention will be explained by means of FIG. 1. In FIG. 1, a bidirectional dischargeable type hydraulic pump 1 which is driven by an electric motor 2 includes three suction/discharge ports B, H, and T. The port B, the port H, and the port T are connected to a bottom chamber of a hydraulic cylinder 3, a head chamber of the hydraulic cylinder 3, and a tank 5, respectively. If the flow rates in the three ports B, H, and T of the hydraulic pump 1 are taken here as QB, QH, and QT respectively, and the ratio (Sb/Sh) of a bottom chamber pressure receiving area Sb to a head chamber pressure receiving area Sh is taken as α, the relation among the flow rates in the ports B, H, and T satisfies the following two equations.

$$QB=QH+QT \tag{1}$$

$$QB/QH=Sb/Sh=\alpha \tag{2}$$

Figure 2:
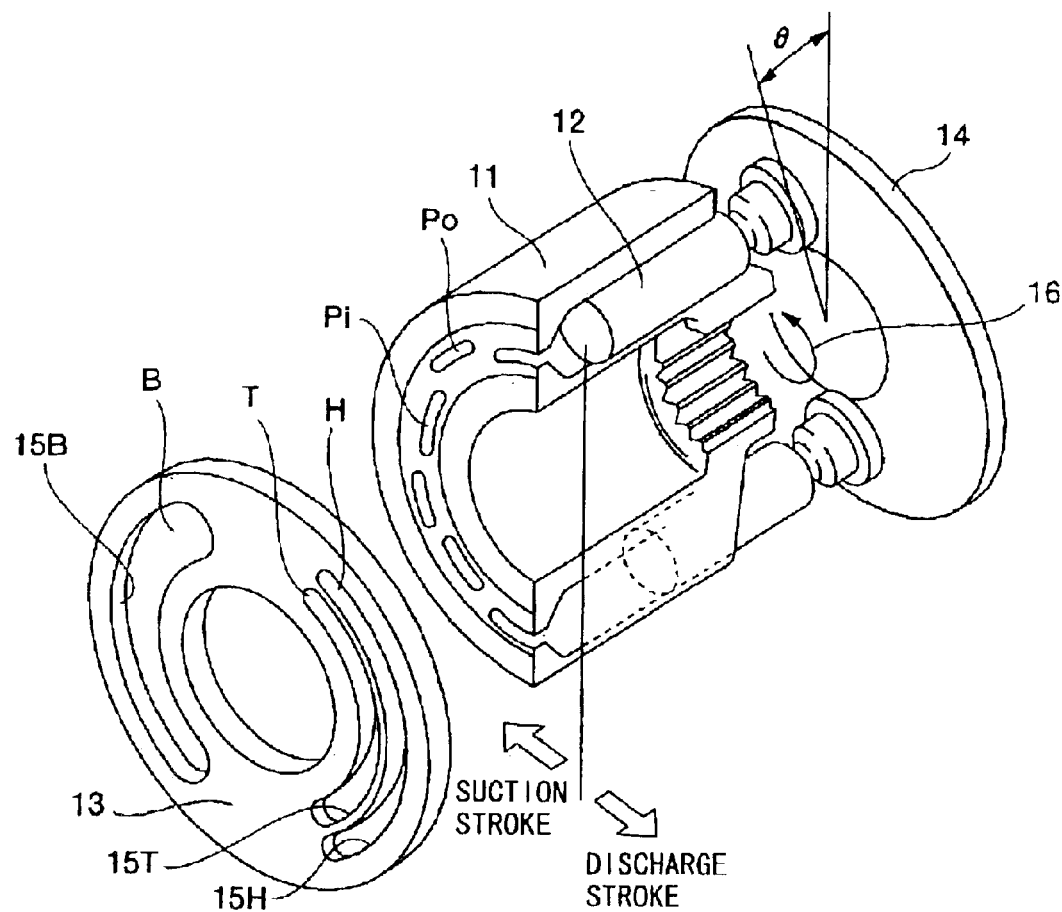
FIG. 2 is a perspective partial sectional view of a principal portion of a piston pump according to a first embodiment of the present invention.

The hydraulic pump 1 with the three ports B, H, and T having such a relation can be constituted, for example, by a piston pump. FIG. 2 is a perspective partial sectional view showing the constitution of a principal portion of the piston pump according to a first embodiment. In FIG. 2, a predetermined number (n) of cylinders parallel to each other in an axis direction are formed in a cylindrical cylinder block 11, and pistons 12 are respectively incorporated in the cylinders. The predetermined number of outside ports Po and inside ports Pi, which communicate with the respective pistons 12, are formed in an end face of the cylinder block 11 on the opposite side to the pistons 12, and this end face abuts on a valve plate 13. In the valve plate 13, with a shaft center as a center, an arcuate long hole 15B constituting the port B is formed on one side, and an arcuate long hole 15H constituting the port H on the outside of the other side and an arcuate long hole 15T constituting the port T on the inside of the other side are formed in parallel with each other in a circumferential direction. The long hole 15B communicates with the outside ports Po and the inside ports Pi, the long hole 15H communicates with the outside ports Po, and the long hole 15T communicates with the inside ports Pi. The respective pistons 12 slidably abut on a swash plate 14 fixed to a pump housing (not shown) at a predetermined swivel angle θ (hereinafter referred to as a swash plate angle θ in the first embodiment). The cylinder block 11 is attached to a shaft (not shown), and this shaft and the cylinder block 11 are rotatably supported by the pump housing. In the first embodiment, as will be described later, displacement is controlled by controlling the swash plate angle θ (namely, the swivel angle θ).

Next, the operation of the piston pump type hydraulic pump 1 will be explained referring to FIG. 2. When the shaft of the hydraulic pump 1 is rotated, the cylinder block 11 is rotated, and the pistons 12 incorporated in the cylinder block 11 perform reciprocating motion following the swash plate 14 which tilts at the swash plate angle θ to thereby repeat pumping actions of suction and discharge. In this case, when the cylinder block 11 is rotated in the direction of the shown arrow 16, the pistons, which touch the long hole 15B (port B) of the valve plate 13, each perform a suction stroke, and the pistons 12, which touch the long hole 15H (port H) and 15T (port T), each perform a discharge stroke. When the cylinder block 11 is continuously rotated by the electric motor 2, oil is sucked from the port B and the oil which is divided in a predetermined ratio is discharged from the port H and the port T, continuously. When the cylinder block 11 is continuously rotated in the opposite direction to the above, oil is sucked from the port H and the port T in the predetermined ratio and the merged oil is discharged from the port B.

If the total number of cylinders of the piston pump is taken as n, the number of cylinders which communicate with the port H (namely, corresponding to the outside ports Po) is taken as nH, the number of cylinders which communicate with the port T (namely, corresponding to the inside ports Pi) is taken as nT, and the number of cylinders which communicate with the port B (namely, corresponding to the outside ports Po and the inside ports Pi) is taken as nB, $$n=nH+nT=nB \quad (3)$$

is obtained. Moreover, if the ratio (Sb/Sh) of the bottom chamber pressure receiving area Sb to the head chamber pressure receiving chamber Sh of the hydraulic cylinder 3 is taken as α as described above, from the equation (3), $$\alpha=n/nH=1+nT/nH$$

is obtained, and hence $$nT/nH=\alpha-1 \quad (4)$$

is obtained. In other words, the number nH of cylinders communicating with the port H and the number nT of cylinders communicating with the port T need to be set based on the pressure receiving area ratio α of the hydraulic cylinder 3.

Figure 3:
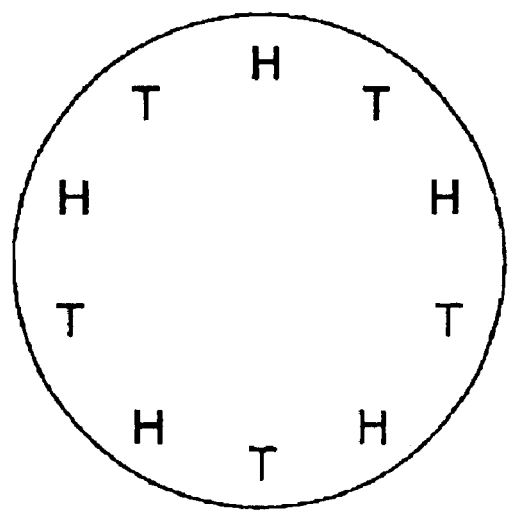
FIG. 3 shows a first cylinder configuration example of the piston pump according to the first embodiment.
Figure 4:
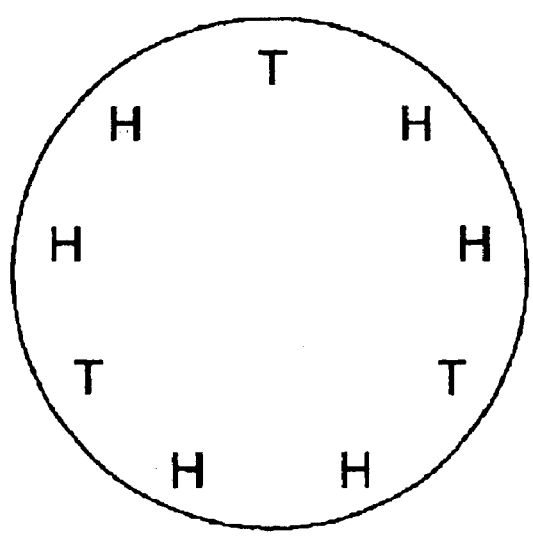
FIG. 4 shows a second cylinder configuration example according to the first embodiment.

Next, an explanation will be given with some configuration examples. As a first example, the case of the pressure receiving area ratio α=2, that is, the case of "the bottom chamber pressure receiving area Sb=2× the head chamber pressure receiving area Sh" (which is frequent in a general hydraulic cylinder) will be explained. In this case, nT/nH=1 is obtained from the equation (4), and if the number nH of cylinders and the number nT of cylinders are set equally, and, for example, the total number n of cylinders is ten, a piston pump having an arrangement such as shown in FIG. 3 is suitable. As a second example, in the case of the pressure receiving area ratio α=3/2, that is, in the case of "the bottom chamber pressure receiving area Sb=(3/2)× the head chamber pressure receiving area Sh", nT/nH=1/2 is obtained from the equation (4), and therefore, a piston pump having an arrangement such as shown in FIG. 4 with the total number n of cylinders as nine. Incidentally, H and T in FIG. 3 and FIG. 4 represent the cylinders communicating with the port H and the cylinders communicating with the port T, respectively.

Operation according to the aforementioned constitution will be explained referring to FIG. 1 and FIG. 2. First, when the hydraulic pump 1 is rotated in the direction of the arrow 16 shown in FIG. 2 by the electric motor 2, oil in the bottom chamber of the hydraulic cylinder 3 is sucked from the port B, part of the oil, that is, pressure oil having a flow rate according to the pressure receiving area ratio α is discharged from the port H and supplied to the head chamber, and the other pressure oil is drained from the port T to the tank 5. On the other hand, when the hydraulic pump 1 is rotated in the opposite direction to the arrow 16 shown in FIG. 2, oil in the head chamber of the hydraulic cylinder 3 is sucked from the port H, concurrently oil in the tank 5 is sucked from the port T, then oil from both the ports are merged, and pressure oil having a flow rate according to the pressure receiving area ratio α is discharged from the port B and supplied to the bottom chamber.

Thanks to the aforementioned constitution, the following effect can be obtained. To balance a difference between a supply rate and a drain rate which is caused by the difference in pressure receiving area between the head chamber and the bottom chamber of the hydraulic cylinder, the ratio of the number of ports for suction to the number of ports for discharge of the hydraulic pump 1 is set at 1:2 or 2:1 depending on the rotation direction of the hydraulic pump. Moreover, the bidirectional dischargeable type hydraulic pump 1, in which the respective totals of its suction rate and discharge rate are equalized, and the ratio of the flow rate in the port connected to the bottom chamber to the flow rate in the ports connected to the head chamber is equalized with the pressure receiving area ratio α of the bottom chamber to the head chamber, is used. Besides, the rate of discharge to the hydraulic cylinder 3 is controlled by controlling the rotation speed of the hydraulic pump 1. Therefore, control in a closed circuit by one hydraulic pump becomes possible, and unlike prior arts, other hydraulic pump, accumulator, and so on to balance the rates of flow to the head chamber and the bottom chamber of the hydraulic cylinder become unnecessary. Accordingly, the circuit configuration becomes simpler, and the number of components reduces, which enables low cost and improved reliability.

A flow switching valve such as a control valve in a cylinder driving circuit disclosed in Japanese Utility Model No. 60-122579 does not exist between the hydraulic pump 1 and the hydraulic cylinder 3, whereby energy loss in this flow switching valve is eliminated. Moreover, by rotating the electric motor 2 by pressure oil sucked from the port B or the port H of the hydraulic pump 1, regenerated energy can be obtained. Accordingly, energy efficiency in the whole driving circuit can be increased. Furthermore, the flow rate and switching of discharge direction of the hydraulic pump 1 are controlled by controlling the rotation speed and rotation direction of the electric motor 2, whereby a regulator, a pilot pump for the regulator, and so on such as in the case of a swash plate angle controlling method become unnecessary, and consequently the constitution can be simplified.

Incidentally, the discharge direction of the hydraulic pump 1 according to the present invention is controlled by switching the rotation direction of the electric motor 2, but it is needless to say that without limiting to the above, it is also suitable to constitute the hydraulic pump 1 by a bidirectional dischargeable type (swash plate type or bent axis type) one and control the discharge direction by controlling the displacement thereof.

Figure 5:
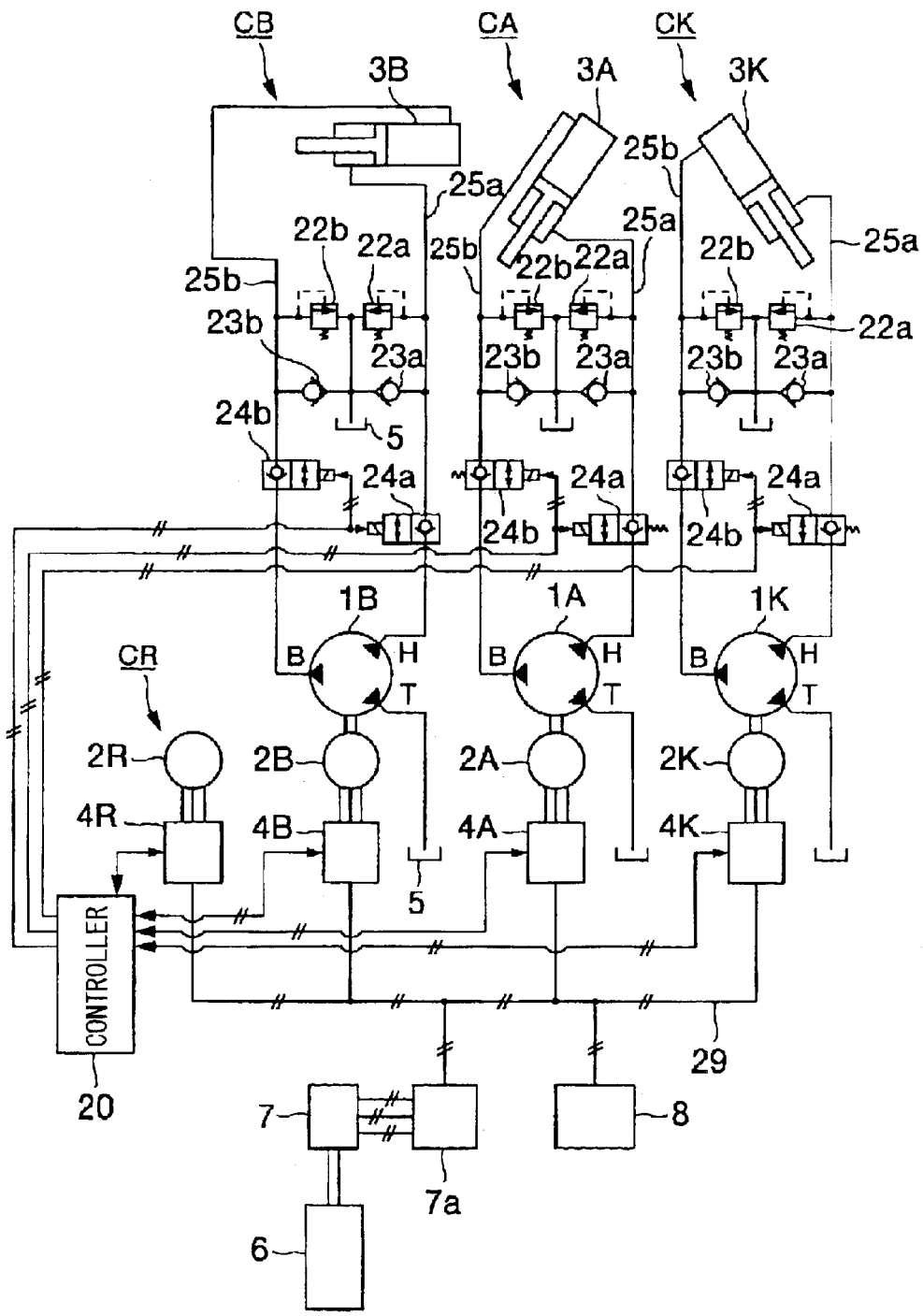
FIG. 5 is a circuit block diagram of an embodiment in which the present invention is applied to a hydraulic shovel.

Next, an embodiment in which the cylinder driving system according to the present invention is applied to a hydraulic shovel as an example of construction equipment will be explained by means of FIG. 5. FIG. 5 is a circuit block diagram of this embodiment. Hydraulic cylinders 3B, 3A, and 3K (hereinafter each referred to only as the hydraulic cylinder 3 unless otherwise distinguished) are provided corresponding to working machines of boom, arm, and bucket, respectively. Moreover, hydraulic pumps 1B, 1A, and 1K (hereinafter each referred to only as a hydraulic pump 1 similarly) for driving the hydraulic cylinders 3B, 3A, and 3K respectively and electric motors 2B, 2A, and 2K (hereinafter each referred to only as an electric motor 2 similarly) for rotationally driving the hydraulic pumps 1B, 1A, and 1K are provided. The hydraulic pump 1 includes three ports B, H, and T with the same suction/discharge rate characteristics as in the basic circuit shown in FIG. 1. Cylinder driving circuits CB, CA, and CK corresponding to these respective working machines of boom, arm, and bucket have the same configuration, and the cylinder driving circuit CB of the boom will be described below.

The port H of the hydraulic pump 1B is connected to a head chamber of the hydraulic cylinder 3B via a first on-off valve 24a and a pipe line 25a. The port B of the hydraulic pump 1B is connected to a bottom chamber of the hydraulic cylinder 3B via a second on-off valve 24b and a pipe line 25b. The port T of the hydraulic pump 1B is connected to the tank 5. A first safety valve 22a and a first check valve 23a are provided between the pipe line 25a and the tank 5. A second safety valve 22b and a second check valve 23b are provided between the pipe line 25b and the tank 5. A safety valve set pressure signal of a controller 20 is inputted to solenoids of the first safety valve 22a and the second safety valve 22b.

Moreover, in this embodiment, a revolving shaft is driven directly (via a speed reducer in many cases) by an electric motor 2R, and constitutes a revolution driving circuit CR. Incidentally, it is also possible to provide a hydraulic motor at an output shaft of the electric motor 2R via a discharge direction type hydraulic pump and drive the revolving shaft by this hydraulic motor.

The electric motors 2B, 2A, 2K, and 2R are each composed of an AC motor such as a three-phase induction motor, and the respective speeds thereof are controlled by inverters 4B, 4A, 4K, and 4R ((hereinafter each referred to only as an inverter 4 unless otherwise distinguished). Power supply input terminals of the respective inverters 4 are connected to a DC voltage line 29 whose voltage is obtained by converting output three-phase AC voltage of a generator 7 driven by an engine 6 into DC voltage by a rectifier 7a. A secondary battery 8 composed of a battery, a capacitor (large-capacity chargeable/dischargeable battery), or the like is connected to the DC voltage line 29.

The respective inverters 4 input speed commands on the respective working machines from the controller 20, and control torque (motor current) in such a manner that the deviation values between the speed commands and speed signals from speed sensors of the respective electric motors 2 are zero. The inverters 4 transmit electric energy regenerated by the respective electric motors 2 to the DC voltage line 29 when regenerative braking is applied during speed control (for example, when the lowering of the boom and the arm is controlled or when revolution is stopped by braking). This regenerated energy is charged into the secondary battery 8 or consumed when the electric motors 2 for the other working machines are driven.

The operation of a working machine driving circuit of the hydraulic shovel according to this configuration will be explained. Similarly to the aforementioned embodiment, the extension/contraction speeds and extension/contraction directions of the respective hydraulic cylinders 3 are controlled by controlling the rotation speeds and discharge directions of the hydraulic pumps 1 by the corresponding electric motors 2 respectively. A difference in flow rate due to the difference in pressure receiving area between the bottom chamber and the head chamber of each of the hydraulic cylinders 3 is absorbed by the ratio of the suction rate to the discharge rate between the port B and the port H of the hydraulic pump 1.

When the oil pressure in the pipe line 25a rises to higher than the set pressure of the first safety valve 22a, the first safety valve 22a opens to allow the pipe line 25a to communicate with the tank 5, thereby preventing the occurrence of abnormal pressure in the pipe line 25a. Likewise, when the oil pressure in the pipe line 25b rises to higher than the set pressure of the second safety valve 22b, the second safety valve 22b opens to allow the pipe line 25b to communicate with the tank 5, thereby preventing the occurrence of abnormal pressure in the pipe line 25b. Accordingly, even if abnormal pressure higher than the set pressure occurs in the bottom chamber or the head chamber of the hydraulic cylinder 3 during an excavating operation, it is possible to lower the pressure to the set pressure or lower, whereby a hydraulic device can be protected. When abnormal pressure occurs in the bottom chamber or the head chamber of the hydraulic cylinder 3, negative pressure (or a vacuum) occurs in the head chamber or the bottom chamber on the opposite side. At this time, the first check valve 23a allows the head chamber and the tank 5 to communicate with each other or the second check valve 23b allows the bottom chamber and the tank 5 to communicate with each other to thereby allow oil to flow into the head chamber or the bottom chamber in which the negative pressure (or the vacuum) occurs, whereby negative pressure (or a vacuum) is inhibited. Consequently, the hydraulic cylinder 3 can be stably operated.

When the rotation of the hydraulic pump 1 is stopped, external force is sometimes applied in a direction in which the hydraulic cylinder 3 contracts by the empty weight of the working machine (boom, arm, or bucket), that is, the working machine lowers. At this time, oil in the bottom chamber or oil in the head chamber of the hydraulic cylinder 3 tries to move to the head chamber or the bottom chamber on the opposite side through the hydraulic pump 1. Accordingly, by shutting off the first on-off valve 24a and the second on-off valve 24b, the aforementioned lowering by the empty weight of the working machine is prevented.

According to this embodiment, the following effect is obtained. The ratio between the flow rates in two ports B and H of each of the hydraulic pumps 1 (namely, the ratio of the suction rate in one port to the discharge rate in the other port) is set according to the pressure receiving area ratio of the bottom chamber to the head chamber of the hydraulic cylinder 3. These two ports B and H are connected to the bottom chamber and the head chamber of the hydraulic cylinder 3 respectively, and the other one port T for sucking or discharging a difference between the suction rate and the discharge rate is connected to the tank. By controlling the discharge rate and discharge direction of the hydraulic pump 1 by the electric motor 2, the hydraulic cylinder 3 can be driven in a closed circuit. Therefore, the electric motor 2 is rotated by pressure oil sucked from the port B or the port H of the hydraulic pump 1, and regenerated energy can be obtained. Moreover, when the speed of each of the working machines is controlled, that is, when the discharge rate of the hydraulic pump 1 is controlled, for example, at the time of boom or arm lowering and at the time of the stop of revolution by braking, regenerative braking by the electric motor 2 is performed. As a result, by charging the regenerated energy into the secondary battery or consuming it when the other working machines are driven, energy can be used effectively, resulting in reduced energy loss and increased energy efficiency.

Incidentally, to prevent cavitation due to insufficient oil quantity in the aforementioned closed circuit, it is also suitable to add oil to compensate a leakage in each hydraulic device into the closed circuit by using a charge pump additionally. Furthermore, although the example in which the speed is controlled by the electric motor of each shaft is explained in the aforementioned embodiment, without limiting to the above, torque control and the like are naturally possible.

Figure 6:
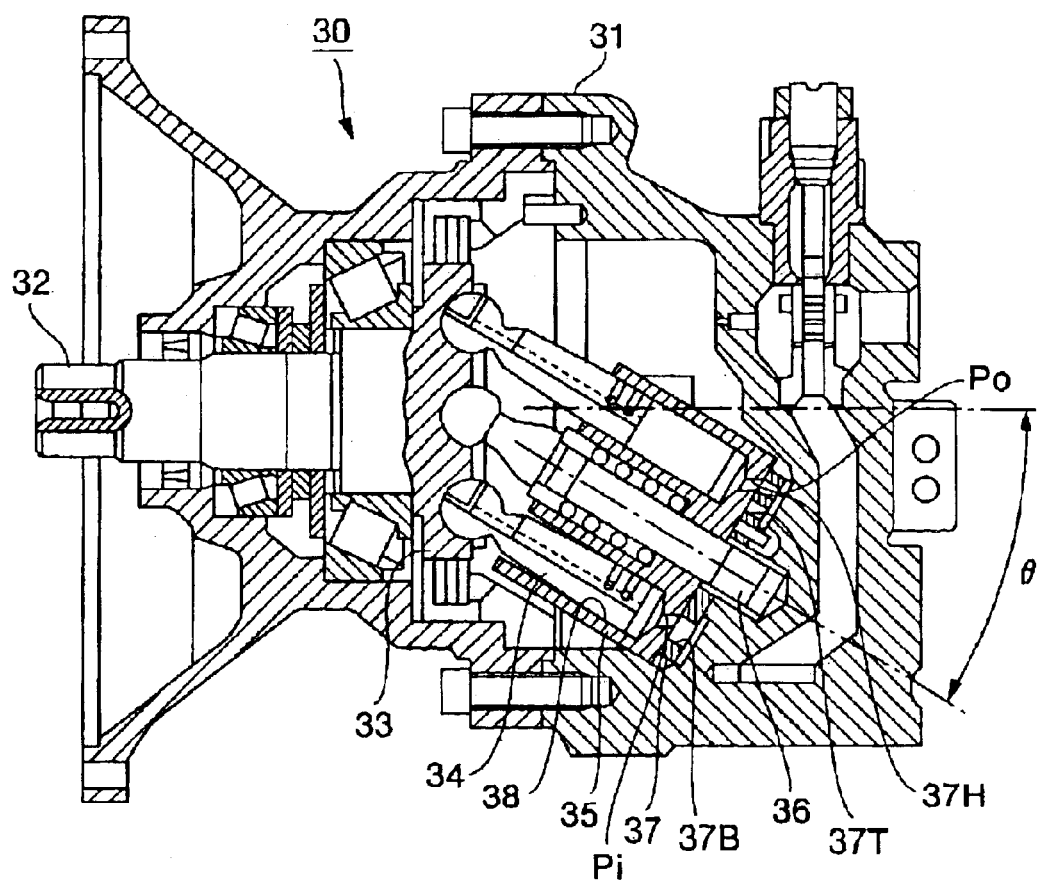
FIG. 6 is a sectional view of a hydraulic pump according to a second embodiment of the present invention.
Figure 7:
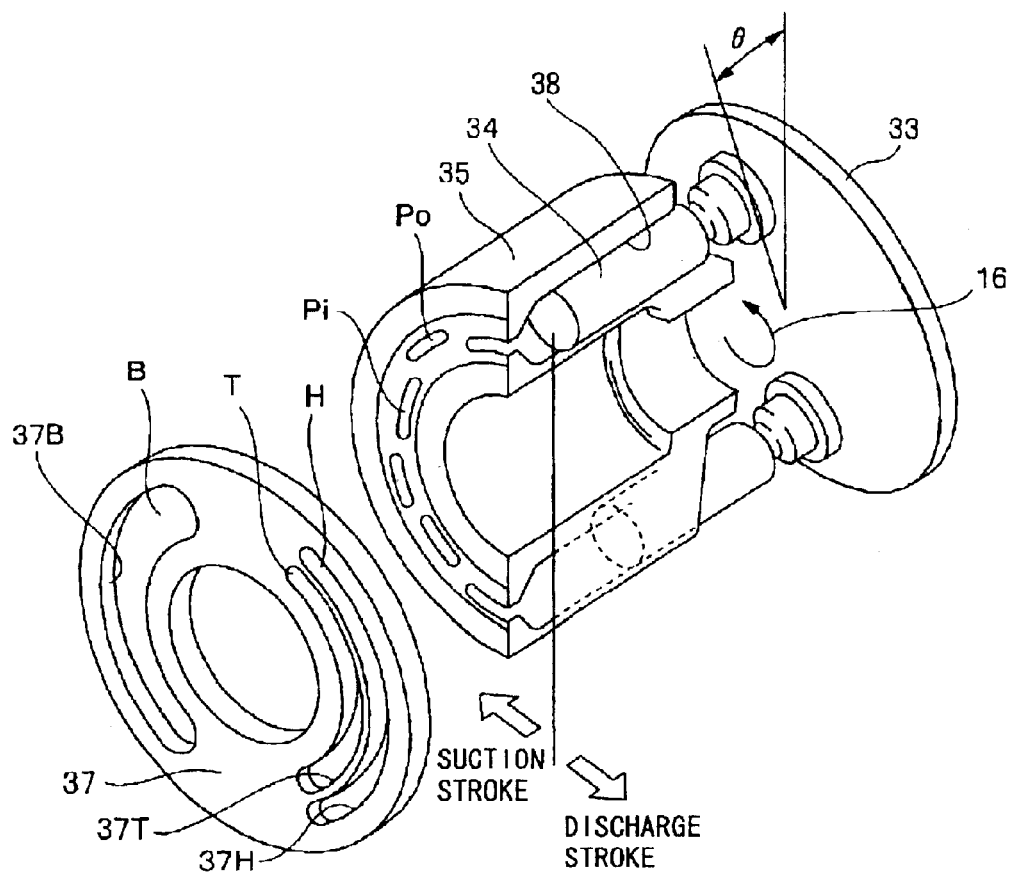
FIG. 7 is a perspective partial sectional view of a principal portion of the hydraulic pump in FIG. 6.

Next, a second embodiment will be explained by means of FIG. 6 to FIG. 8. FIG. 6 is a sectional view of a hydraulic pump according to the second embodiment, FIG. 7 is a perspective partial sectional view of a principal portion of the hydraulic pump, and FIG. 8 is an explanatory view of a cylinder block of the hydraulic pump.

In FIG. 6, in a bent axis pump 30, a driving shaft 32 is rotatably supported in a housing 31, and a disk 33 is provided at one end portion of the driving shaft 32. A cylinder rotating shaft 36 is coupled to a surface of the disk 33 on the opposite side to the driving shaft 32 in the housing 31. The shaft center of the cylinder rotating shaft 36 is provided at a predetermined swivel angle θ to the shaft center of the driving shaft 32. One end side of the cylinder rotating shaft 36 is coupled to a rotation center portion of the surface of the disk 33, and the other end side is rotatably supported by the housing 31. A cylinder block 35 is fitted in an outer peripheral portion of the cylinder rotating shaft 36 while positioned in a rotation direction. As shown in FIG. 8, a predetermined number of cylinder holes 38 are formed at almost even intervals around the cylinder rotating shaft 36 and parallel to the cylinder rotating shaft 36. Pistons 34 are inserted into the respective cylinder holes 38. Tip portions of the pistons 34 are slidably coupled to the surface of the disk 33 on the cylinder rotating shaft 36 side. By the aforementioned configuration, the cylinder block 35 rotates about the cylinder rotating shaft 36 via the cylinder rotating shaft 36 by the rotation of the disk 33 caused by the rotation drive of the driving shaft 32, and the pistons 34 perform reciprocating motion in the cylinder holes 38 of the cylinder block 35. A valve plate 37 fixed to the housing 31 slidably abuts on a bottom surface of the cylinder block 35.

Figure 8:
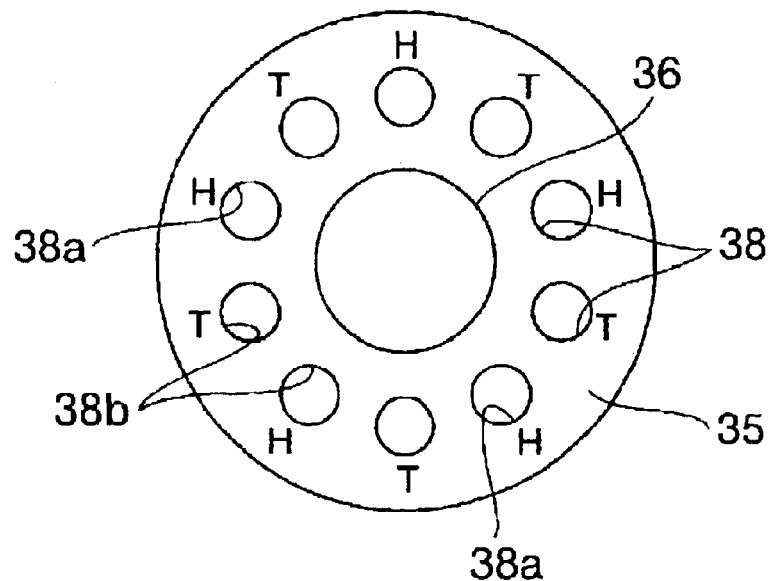
FIG. 8 is an explanatory view of a cylinder block of the hydraulic pump in FIG. 6.

The respective cylinder holes 38 formed in the cylinder block 35 correspond to the port H and the port T (See FIG. 1) as shown in FIG. 8, and in this example, the same cylinder configuration as that in the first embodiment shown in FIG. 3 is used. As shown in FIG. 6 and FIG. 7, in bottom portions of the respective cylinder holes 38 corresponding to the port H and the port T, the outside ports Po and the inside ports Pi, which allow the cylinder holes 38 and a bottom surface of the cylinder block 35 to communicate with each other, are formed. In the valve plate 37, with a shaft center as a center, an arcuate long hole 37B constituting the port B is formed on one side. An arcuate long hole 37H constituting the port H on the outside of the other side and an arcuate long hole 37T constituting the port T on the inside of the other side are formed in parallel with each other in a circumferential direction. The long hole 37B communicates with the outside ports Po and the inside ports Pi, the long hole 37H communicates with the outside ports Po, and the long hole 37T communicates with the inside ports Pi.

In this embodiment, the diameters of the respective cylinder holes 38 corresponding to the port H and port T are set according to the ratio α of the bottom chamber pressure receiving area Sb to the head chamber pressure receiving area Sh of the hydraulic cylinder to be driven. Namely, when, in "n=nH+nT" as in the equation (3) (in this example, the total number of cylinders n=10, nH=nT=5), the pressure receiving areas of the respective cylinder holes 38 corresponding to the port H are taken as S1H, S2H, . . . SnH respectively, and the pressure receiving areas of the respective cylinder holes 38 corresponding to the port T are taken as S1T, S2T, . . . SnT respectively, the diameters of the respective cylinder holes 38 are worked so as to satisfy the following equation.

$$\alpha = \{(S1H+S2H+\ldots+SnH)+(S1T+S2T+\ldots+SnT)\}/(S1H+S2H+\ldots+SnH) = 1+\{(S1T+S2T+\ldots+SnT)/(S1H+S2H+\ldots+SnH)\}$$

Incidentally, the diameters of the cylinder holes 38 corresponding to the port H and port T may be the same, respectively, or only part of them may be different. FIG. 8 shows an example in which the diameters of two cylinder holes 38a out of five cylinder holes corresponding to the port H are set at a smaller value than the diameters of the other cylinder holes 38b corresponding to the port H and the port T.

According to the constitution of the second embodiment, the following effect is obtained in addition to the effect in the first embodiment. Since the size of the diameter of each cylinder hole 38 is adjusted in this embodiment, the ratio of the suction rate or the discharge rate between the port H and the port T of the hydraulic pump can be precisely set according to the bottom-to-head pressure receiving area ratio α of the hydraulic cylinder. Accordingly, adaptation to suit various hydraulic cylinders having different hydraulic cylinder bottom-to-head pressure receiving area ratios α can be performed easily and precisely. Moreover, a reduction in size becomes possible since one pump has a double pump function, and according to the bent axis pump to which the present invention is applied, an increase in speed also becomes possible, whereby a reduction in cost and improvement in vehicle mountability can be realized. Furthermore, since each cylinder can be used at its maximum volumetric efficiency, this hydraulic pump can be used efficiently.

Figure 9:
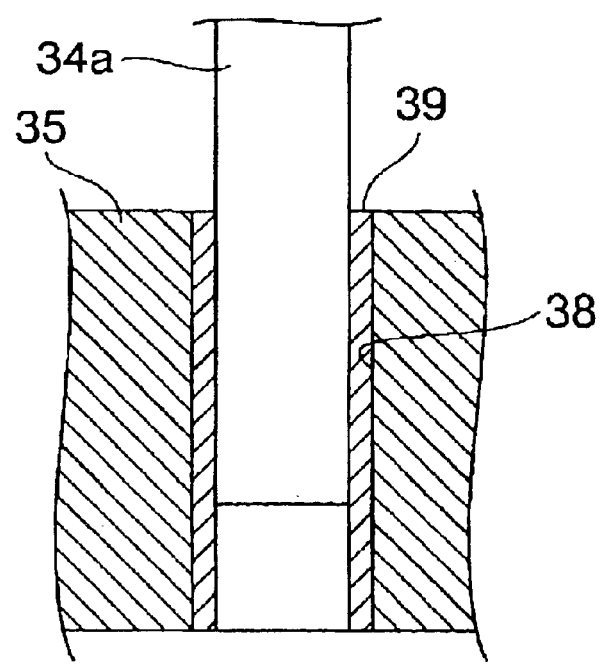
FIG. 9 is a sectional view of a principal portion of a cylinder block according to a third embodiment of the present invention.

Next, a third embodiment will be explained by means of FIG. 9. FIG. 9 is a sectional view of a principal portion of a cylinder block according to the third embodiment. Although the diameter of each of the cylinder holes 38 is adjusted by working the hole's diameter itself according to the target ratio α in the aforementioned second embodiment, the adjustment is made by inserting a sleeve 39 with a predetermined inside diameter according to the target ratio α in the cylinder hole 38 in this embodiment. Rough adjustment according to the target ratio α is made by adjusting the number nH of cylinders corresponding to the port H and the number nT of cylinders corresponding to the port T, and fine adjustment is made by inserting the sleeve 39 whose inside diameter is adjusted into the predetermined cylinder hole 38.

It is desirable in terms of inventory management cost and manufacturing cost to have a hydraulic pump including a cylinder block, which previously has the maximum diameter capable of covering the scope of application of this hydraulic pump as the diameter of the cylinder hole 38, in stock as a common component. Hence, it is only required to make adjustment by fitting the inside diameter of the sleeve 39 to the hydraulic cylinder and insert the sleeve 39 in the cylinder hole 38, whereby general versatility increases.

According to this constitution, only the adjustment of the inside diameter of the sleeve 39 is required, and therefore the hydraulic pump having a function equal to a double pump, which is fitted to the bottom-to-head pressure receiving area ratio α of the hydraulic cylinder, can be structured easily and precisely. Moreover, application to other hydraulic cylinders having different bottom-to-head pressure receiving area ratios α is possible by only exchanging the sleeve 39, whereby the general versatility increases. Furthermore, it is possible to have the hydraulic pump equipped with the aforementioned cylinder block having an oversize cylinder hole diameter in stock as a common component, whereby the inventory management cost and the manufacturing cost can be reduced. Incidentally, other effects are the same as those in the aforementioned embodiment, and hence the explanation thereof is omitted.

Figure 10:
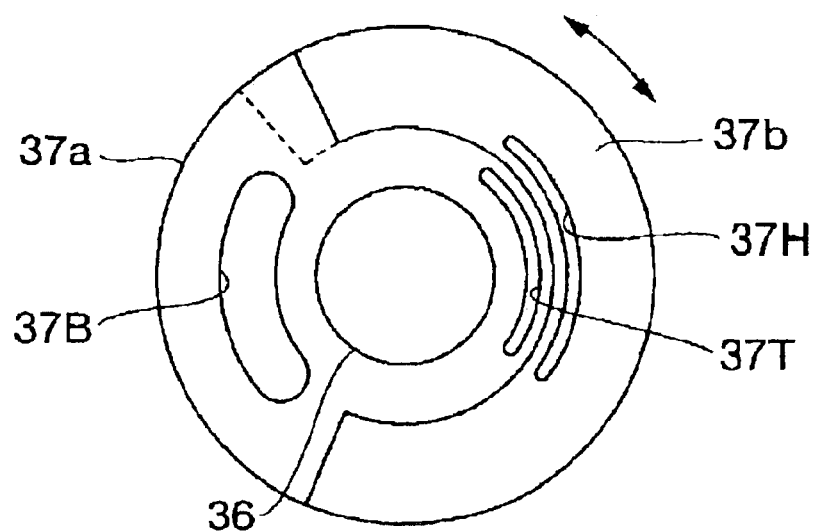
FIG. 10 is a plan view of a valve plate of a hydraulic pump according to a fourth embodiment of the present invention.

Next, a fourth embodiment will be explained. FIG. 10 is a plan view of a valve plate of a hydraulic pump according to the fourth embodiment. The explanation is given with the same bent axis pump as shown in FIG. 6 in the second embodiment as an example of a machine to which the fourth embodiment is applied. Incidentally, the same reference numerals and symbols will be given to components which have almost the same function as those shown in FIG. 6 to FIG. 8, so that the explanation will be omitted.

In FIG. 10, the valve plate 37 has two plates 37a and 37b, and in one plate 37a, the arcuate long hole 37B constituting the port B and the arcuate long hole 37T constituting the port T are formed. In the other plate 37b, the arcuate long hole 37H constituting the port H is formed. The plate 37a has an almost semicircular large diameter portion with almost the same outside diameter as the cylinder block 35 on the side on which the long hole 37B is provided, and an almost semicircular small diameter portion with an almost intermediate outside diameter between the outside diameter of the long hole 37T and the outside diameter of the long hole 37H on the side on which the long hole 37T is provided. The plate 37b has an almost semi-annular shape including an outside circumferential portion with almost the same outside diameter as the cylinder block 35 and the inside circumferential portion with an inside diameter slightly larger than the outside diameter of the small diameter portion of the plate 37a. The two plates 37a and 37b are provided with overlap portions respectively at end portions in a circumferential direction in such a manner that the small diameter portion and the inside circumferential portion slidably abut on each other in the circumferential direction, and that the bottom surface of the cylinder block 35 is always covered so that oil leakage never occurs. Incidentally, to close a gap in a thickness direction between both the plates 37a and 37b in these overlap portions, side wall portions (not shown) are formed in either one of both the plates 37a and 37b. The other plate 37b is provided with a rotating means (not shown) such as an electric motor for rotating the other plate 37b by a predetermined angle with respect to one plate 37a to enable positioning.

The operation of this embodiment will be explained. When the two plates 37a and 37b are shifted relatively in the circumferential direction, the relative positions of the long hole 37H (port H) and the long hole 37T (port T) are changed, and hence the timing of suction or discharge of the sifted port H is changed. Thereby, the volumetric efficiency of cylinders corresponding to the port H changes, that is, the volume of suction or discharge equivalently changes. Accordingly, the cylinder volume is finely adjusted by adjusting the relative positions of the long hole 37H (port H) and the long hole 37T (port T) so as to satisfy the target ratio α.

As a result, the following effect is obtained in addition to the effects in the second embodiment. Fine adjustment can be made in such a manner that the volumetric efficiency is optionally changed by adjusting the relative angles of the ports H and T of the two plates 37a and 37b constituting the valve plate 37 to thereby obtain the ratio α fitted to the hydraulic cylinder. Accordingly, one and the same hydraulic pump can be used for various types of hydraulic cylinders, whereby the general versatility can increase, and the hydraulic pump can be used in common, leading to reduced inventory management cost and manufacturing cost.

Figure 11:
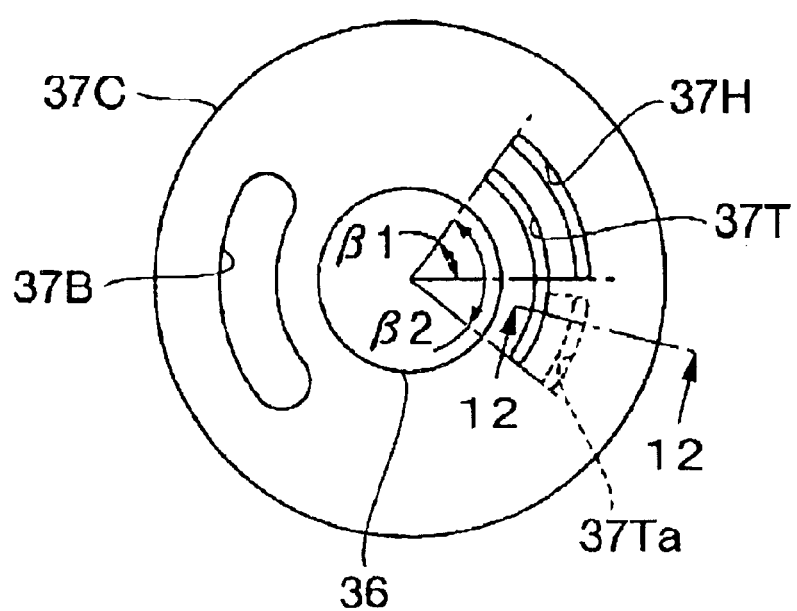
FIG. 11 is a plan view of a valve plate of a hydraulic pump according to a fifth embodiment of the present invention.
Figure 13:
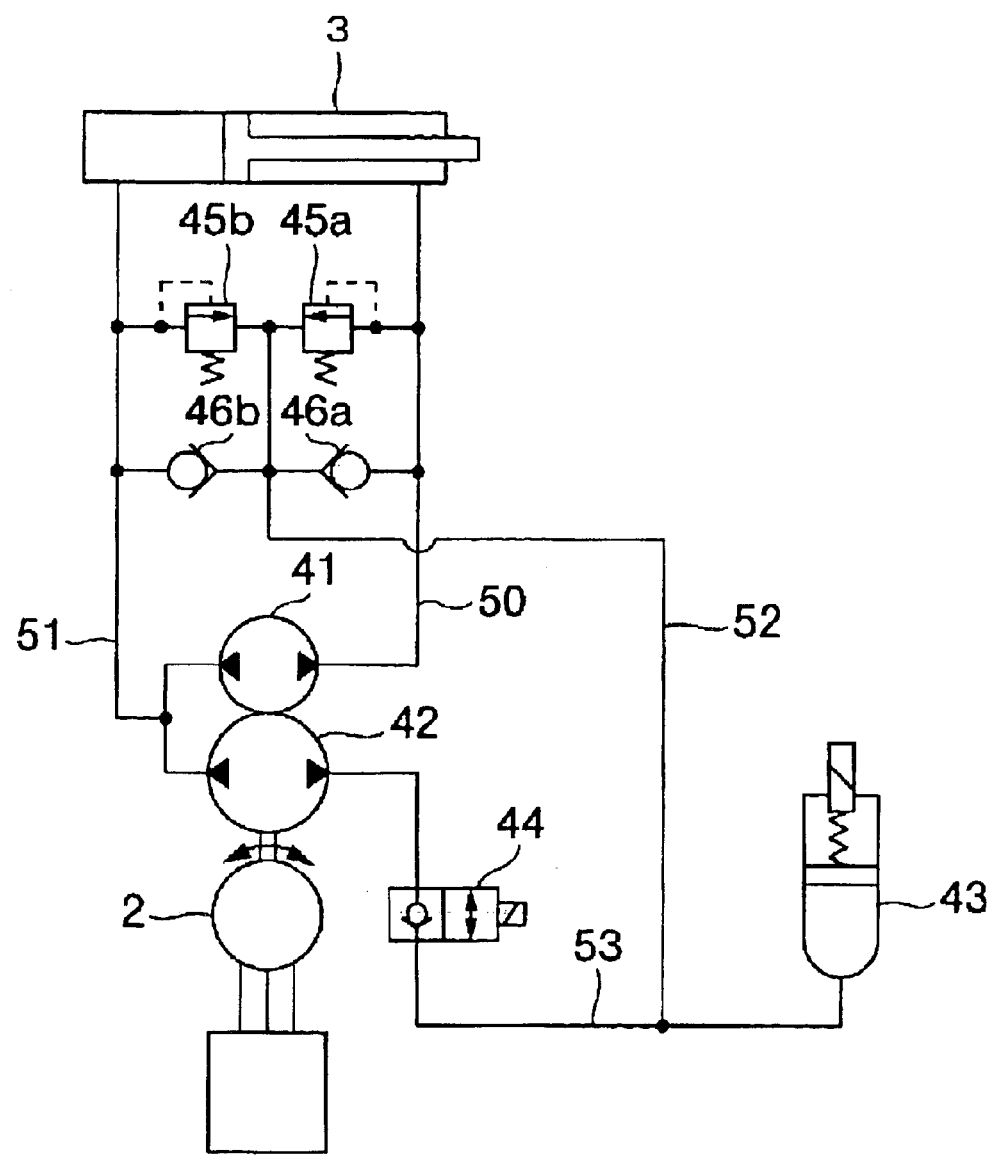
FIG. 13 is a principal portion of a cylinder driving circuit diagram according to a first prior art.
Figure 14:
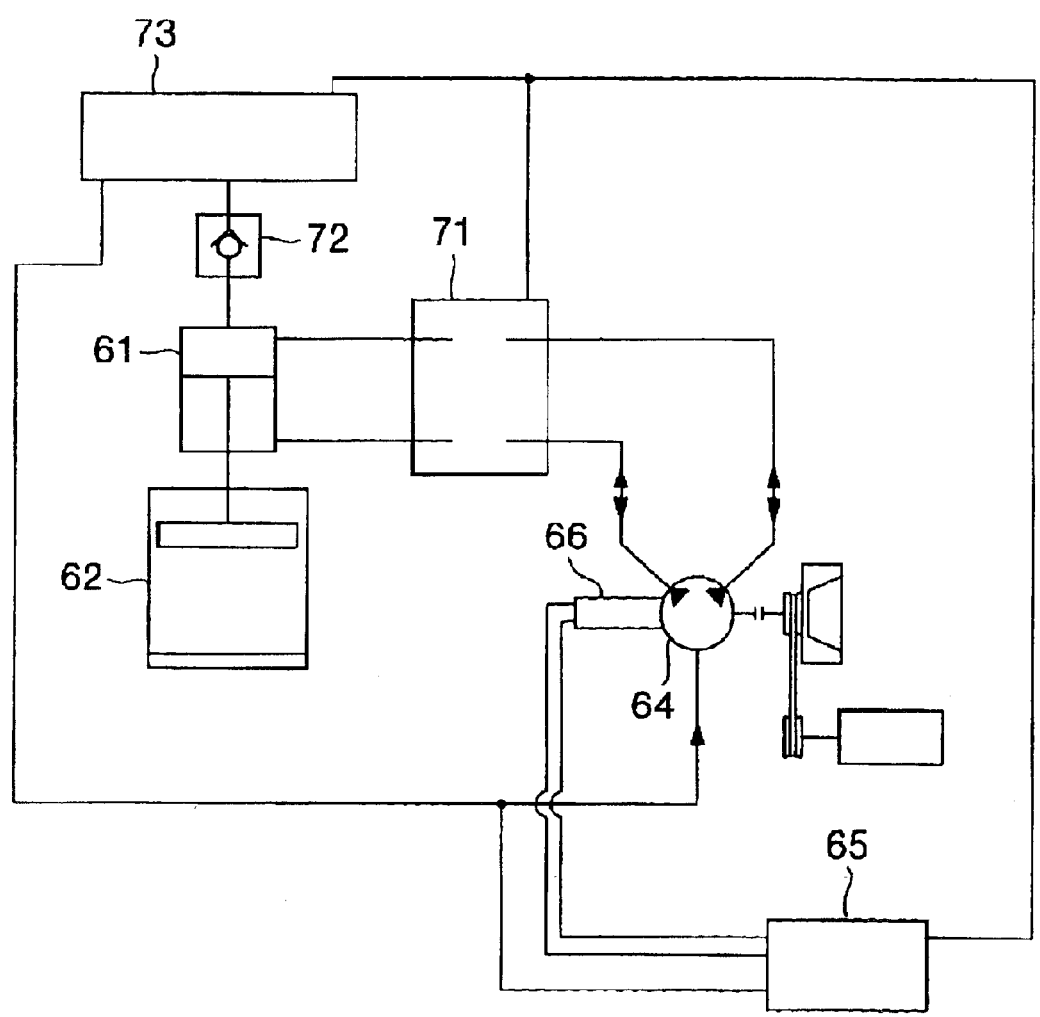
FIG. 14 is a cylinder driving circuit diagram according to a second prior art.

Next, a fifth embodiment will be explained by means of FIG. 11 and FIG. 12. FIG. 11 is a plan view of a valve plate of a hydraulic pump according to the fifth embodiment, and FIG. 12 is a sectional view taken along the line 12—12 in FIG. 11. The explanation is given with the same bent axis pump as shown in FIG. 6 in the second embodiment as an example of a machine to which the fifth embodiment is applied. Incidentally, the same reference numerals and symbols will be given to components which have almost the same function as those shown in FIG. 6 to FIG. 8, so that the explanation will be omitted.

In a valve plate 37c, an opening angle β1 in the circumferential direction of the long hole 37H constituting the port H is formed smaller than an opening angle β2 in the circumferential direction of the long hole 37T constituting the port T. An arcuate long hole 37Ta communicating with the long hole 37T is formed on a circumference with the same radius as the long hole 37H. The arcuate long hole 37B constituting the port B is formed on the opposite side to the long hole 37H, the long hole 37Ta, and the long hole 37T with the cylinder rotating shaft 36 between them. The constitution except the valve plate 37c is the same as that in the aforementioned first to third embodiments, and the explanation thereof is omitted here.

The operation according to the constitution of this embodiment will be explained. While the cylinder block 35 is rotating, the piston 34 of the cylinder hole 38 functions for the port H when the cylinder hole 38 communicates with the long hole 37H via the outside port Po. On the other hand, the piston 34 of the cylinder hole 38 functions for the port T when the cylinder hole 38 communicates with the long hole 37Ta. Hence, when the long hole 37H, the long hole 37Ta, and the long hole 37T are on the discharge stroke side of the hydraulic pump, most of oil in the cylinder holes 38 having the outside ports Po is discharged from the port H via the long hole 37H, and the remaining oil is discharged from the port T via the long hole 37Ta and the long hole 37T. On the other hand, oil in the cylinder holes 38 having the inside ports Pi is discharged from the port T via the long hole 37T. Incidentally, in the case of the suction stroke, the inflow direction of oil is opposite to the above. Accordingly, the quantity of oil passing through the long hole 37H is the cylinder capacity of the port H, and the quantity of oil passing through the long hole 37Ta and the long hole 37T is the cylinder capacity of the port T. Therefore, the aforementioned bottom-to-head pressure receiving area ratio α of the hydraulic cylinder is adjusted by adjusting the circumferential direction opening angle β or the opening area of at least either one of the long hole 37H, the long hole 37Ta, and the long hole 37T.

Consequently, the following effect is obtained in addition to the effects in the second embodiment. Namely, rough setting of the bottom-to-head pressure receiving area ratio α of the hydraulic cylinder is performed by adjusting the number nH of cylinders for the port H having the outside ports Po and the number nT of cylinders for the port T having the inside ports Pi. Fine adjustment, which is difficult to accomplish by the aforementioned adjustment, can be made by adjusting the circumferential direction opening angle β or the opening area of at least either one of the long hole 37H, the long hole 37Ta, and the long hole 37T of the valve plate 37c. Accordingly, adaptation to suit various hydraulic cylinders having different hydraulic cylinder bottom-to-head pressure receiving area ratios α can be performed easily and precisely. Moreover, similarly to the above, a reduction in the size of the pump and an increase in speed also become possible, whereby a reduction in cost and improvement in vehicle mountability can be realized.

Incidentally, in the aforementioned second to fifth embodiments, explanations are given with the bent axis pump as an example of the hydraulic pump to which the present invention is applied, but without limiting to this, the present invention can be naturally applied to a swash plate type pump.

As described above, the following effects are obtained by the present invention. Three ports of the hydraulic pump are formed to have a relation in which the discharge rate (suction rate) in the first port is the sum of the respective suction rates (discharge rates) in the second port and the third port, and that the ratio of the discharge rate (suction rate) in the first port to the suction rate (discharge rate) in the second port is the pressure receiving area ratio of the bottom chamber to the head chamber of the hydraulic cylinder. By connecting the first port, the second port, and the third port of this hydraulic pump to the bottom chamber, the head chamber, and the tank, respectively, and controlling the discharge rate and the discharge direction by controlling the rotation speed and rotation direction of the hydraulic pump, a closed circuit driving system can be constituted by one hydraulic pump. Accordingly, the circuit configuration is simple, which enables low cost. Moreover, energy loss can be reduced by eliminating a switching valve for controlling the flow rate, and since the electric motor is rotated by pressure oil in the bottom chamber or the head chamber of the hydraulic cylinder via the hydraulic pump, it becomes possible to obtain regenerated energy.

What is claimed is:

1. A cylinder driving system, comprising:
   a hydraulic cylinder;
   a hydraulic pump which comprises three suction/discharge ports including: (i) a first port for supplying oil to a bottom chamber of said hydraulic cylinder and for draining oil from said bottom chamber, (ii) a second port for draining oil from a head chamber of said hydraulic cylinder and for supplying oil to said head chamber, and (iii) a third port for draining oil from a tank and for supplying oil to said tank, wherein a suction rate in said first port is a sum of respective discharge rates in said second port and said third port, and a discharge rate in said first port is a sum of respective suction rates in said second port and said third port; and
   an electric motor for controlling a rotation speed and a rotation direction of said hydraulic pump;
   wherein the hydraulic pump comprises one of a swash plate pump and a bent axis pump; and
   wherein regenerated energy is recovered via the electric motor during regenerative braking of the hydraulic pump.

2. The cylinder driving system according to claim 1, wherein a discharge rate, a suction rate, and a discharge direction of said hydraulic pump are controlled by one of controlling the rotation speed and the rotation direction of said driving source and controlling a displacement of said hydraulic pump.

3. An energy regenerating method for a cylinder driving system, said method comprising:
   controlling a rotation speed and a rotation direction of a hydraulic pump by an electric motor, wherein the pump comprises three suction/discharge ports including: (i) a first port for supplying oil to a bottom chamber of a hydraulic cylinder and for draining oil from said bottom chamber, (ii) a second port for draining oil from a head chamber of said hydraulic cylinder and for supplying oil to said head chamber, and (iii) a third port for draining oil from a tank and for supplying oil to said tank, wherein a suction rate in said first port is a sum of respective discharge rates in said second port and said third port, and a discharge rate in said first port is a sum of respective suction rates in said second port and said third port; and
   recovering regenerated energy during regenerative braking of said hydraulic pump via said electric motor.

4. A cylinder driving system, comprising:
   (i) a hydraulic cylinder;
   (ii) a hydraulic pump which comprises:
      a plurality of cylinder holes including a first group of cylinder holes and a second group of cylinder holes;
      a first port which is adapted to communicate with both the first group and the second group of cylinder holes so as to supply oil to a bottom chamber of the hydraulic cylinder and drain oil from the bottom chamber of the hydraulic cylinder;
      a second port which is adapted to communicate with only the first group of the plurality of cylinder holes so as to drain oil from a head chamber of the hydraulic cylinder and supply oil to the head chamber of the hydraulic cylinder; and
      a third port which is adapted to communicate with only the second group of the plurality of cylinder holes so as to drain oil from a tank and supply oil to the tank;
      wherein a flow rate of the first port is a sum of respective flow rates of the second port and the third port; and
   (iii) an electric motor for controlling a rotation speed and a rotation direction of said hydraulic pump;
   wherein regenerated energy is recovered via the electric motor during regenerative braking of the hydraulic pump.

5. The cylinder driving system according to claim 4, wherein a ratio of a total number of cylinder holes to a number of the first group of cylinder holes is equal to a ratio of a bottom chamber pressure receiving area to a head chamber pressure receiving area of the hydraulic cylinder.

6. The cylinder driving system according to claim 4, wherein a ratio of a sum of pressure receiving areas of the first group of cylinder holes and of pressure receiving areas of the second group of cylinder holes to the sum of the pressure receiving areas of the first group of cylinder holes is equal to a ratio of a bottom chamber pressure receiving area to a head chamber pressure receiving area of the hydraulic cylinder.

7. The cylinder driving system according to claim 4, wherein a diameter of at least one of the cylinder holes is adjusted by inserting a sleeve therein.

8. The cylinder driving system according to claim 4, wherein relative positions of the first port and the third port are adjustable.

9. The cylinder driving system according to claim 4, wherein an area of at least one of the second port and the third port is set in accordance with a ratio of a bottom chamber pressure receiving area to a head chamber pressure receiving area of the hydraulic cylinder.

* * * * *